(No Model.)
C. E. EMERY.
ELECTRIC DYNAMO OR MOTOR.
No. 585,307. Patented June 29, 1897.
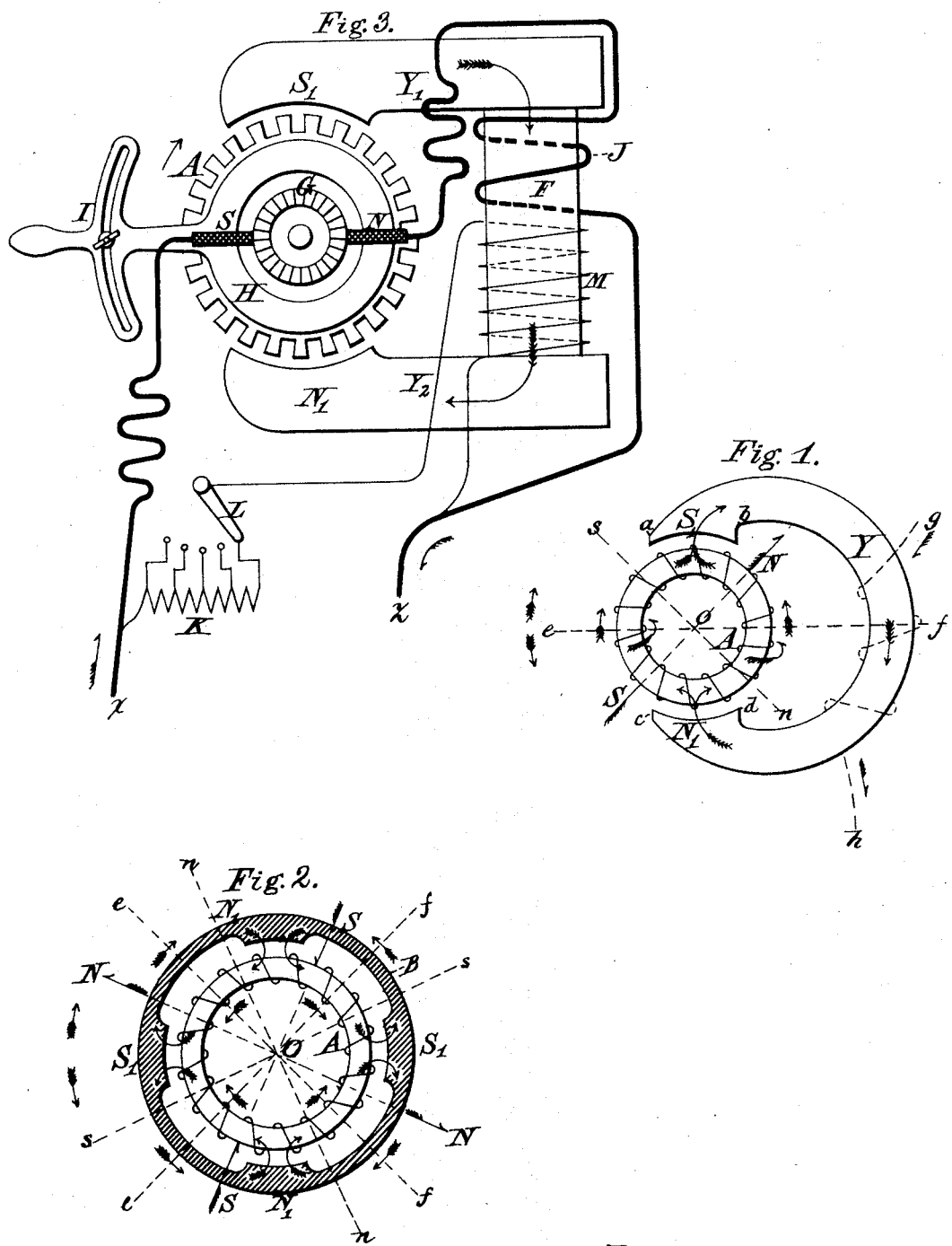

UNITED STATES PATENT OFFICE.

CHARLES E. EMERY, OF BROOKLYN, NEW YORK.

ELECTRIC DYNAMO OR MOTOR.

SPECIFICATION forming part of Letters Patent No. 585,307, dated June 29, 1897.

Application filed April 20, 1893. Serial No. 471,064. (No model.)

*To all whom it may concern:*

Be it known that I, CHARLES E. EMERY, of the city of Brooklyn, county of Kings, and State of New York, (office New York city,) have made a new and useful Improvement in Relation to Electric Dynamos or Motors; and I do hereby declare that the following is a full, clear, and exact description of the same, reference being had to the accompanying drawings, making part of this specification.

It was formerly common in the construction of small electric motors to attract one or more keepers or simple bars of iron from one electromagnet to another by sending current through the coils of such magnets successively and thus producing rotary motion. In one development of this feature the magnetic poles in a stationary Gramme ring have by means of commutated coils been shifted angularly, thereby causing an interior bar to follow the shifting poles like a compass-needle and thus produce a rotary motion. Most of these devices have come to be considered mere toys and the system has not been suggested as capable of general economical application. It is also known that an ordinary dynamo with a Gramme-ring armature will run as a motor without exciting the field-coils if the brushes be advanced angularly toward the pole-pieces from a position midway between the same. Kapp states: "It must be remembered that an armature will revolve in a non-excited field, though with considerable waste of current." The fact that no motors are constructed in this way for the market shows that the principles underlying such operation have not heretofore been understood or that it was considered a mere incidental feature having no substantial value. In later years it has been pointed out that there is at times a field produced by the armature-coils, and in treating of armature reaction it is recognized that such armature-field varies with the position of the brushes, but the absolute value of such field has not been ascertained and definitely stated, so that it can be utilized in place of a field derived from separate field-coils. I have discovered the principle underlying the operation without field-coils and find that not only is a field produced across an armature by the coils of the armature itself under certain conditions which I can definitely point out, but that I can also designate the particular coils of the armature, which under the various conditions operate to produce a field in the same way as the series field-coils of a field excited independently of the armature. Moreover, with this knowledge the well-established principles of dynamo and motor construction may be applied in proportioning dynamos and motors on this system and thereby reasonable economy be obtained with extreme simplicity of construction.

My invention consists of an electric dynamo or motor without field-coil based on the development of the discovery that the operation of shifting the commutating-brushes from mid-position through a given angle of commutation has the effect to produce a field across the armature and through the pole-pieces and yoke, of which the exciting force in ampere-turns is substantially measured by the full current flowing through both branches of the armature multiplied by the number of armature-conductors included in the double angle of commutation on one side of the armature.

My invention further consists of a dynamo or motor of special details and proportions adapted to fully utilize the discovery above named.

Figure 1 is a diagrammatic vertical cross-section of a bipolar dynamo or motor with armature, pole-pieces, and yoke. Fig. 2 is a corresponding diagrammatic vertical cross-section of a four-pole dynamo or motor without field-coils. Fig. 3 is a diagrammatic vertical cross-section, partly in elevation, of a bipolar motor with shunt and series field-coils and shifting brushes.

In Fig. 1, A is a diagrammatic representation of a closed-coil Gramme-ring armature. N' and S' are the pole-pieces, made somewhat more narrow than is customary and connected by a yoke Y. The line $e\,f$, which crosses the diagram midway between the pole-pieces, is called the "central" or "normal" line of commutation. If by means of suitable brushes located on this line a current be sent through the coils, consequent poles will be formed in the iron core of the armature opposite the brushes, but no motion will take place unless the field be excited, as may be done by passing an electric current through a conductor $g\ h$, (shown in dotted lines,) wound in a spiral around the core Y, when the armature will turn in accordance with well-known principles of electric-motor construction, the direction of motion being determined by the direction of the current through the armature relative to that through the field-coils, and by changing the direction in one the motor will run in the opposite direction. If, however, the brushes be together revolved to a vertical position opposite the centers of the pole-pieces and current be considered as moving through the armature-coils in parallel circuit in the two branches from one brush to the other, consequent poles will be formed at the top and bottom of the armature, and in this case without current through $g\ h$ the armature-coils will establish a magnetic circuit through the armature-core and yoke Y, but there will be no motion, because the poles in the armature are formed in line with the pole-pieces. If now the line of commutation be changed to S N at an angle $e\ O\ S$ with the normal line of commutation and we draw another line $n\ s$ across the armature, so as to make the angle $e\ O\ s$ equal to the angle above mentioned, which may be called the "angle of commutation," I have discovered that the armature-coils included in the double angle of commutation $S\ O\ s$ are effective for producing a field or a flow of lines across the armature-conductors, and as in this case the consequent poles in the core of the armature at S and N are not coincident with the pole-pieces N' and S' the armature moves. The direction of motion is such that the portion of the surface of the armature at the moment in the plane of commutation or opposite each pole in the armature seeks the nearest pole-piece, which is, as will be seen, of opposite polarity by induction—that is, with the line of commutation at N S the motion in Fig. 1 will be from right to left and with such line at $n\ s$ the motion would be from left to right, independent of the direction of current in each case; but it will be found that if the direction of motion of the lines in the field be derived by known rules from the direction of the current the direction of the motion of the armature for a given direction of current through the inductors crossing the lines of the field will also be in accordance with well-known rules on the subject. The magnetic lines generated in any particular case must necessarily pass through a complete circuit back to the point of beginning. The phenomena is readily understood if it be assumed that there is an actual flow in a magnetic circuit, such as would take place if a very light fluid, which could readily course between the atoms of the metal, were forced to move in definite paths like water in a pipe. If a bar be magnetized by a coil, a magnet is formed and the lines which we consider as originating at the south pole pass from the north pole of the magnet back to the south pole through any external circuit available, iron having the greatest permeability, but air acting also to convey the same to a less extent. If electric current were delivered to the armature-coils at S and passed out at N, the ring would become, as a whole, one magnet, as if it were a bar instead of a ring. This condition results from the fact that the ampere-turns in the two branches of the circuit oppose each other at S and N, forming consequent poles. The term "ampere-turns" is used in a conventional sense to represent the exciting force which produces magnetization. Poles in the armature opposite the plane of commutation are also formed in a cylinder or drum armature. The armature separately considered is, however, only under magnetic stress, like a bar-magnet, and as it has no closed magnetic circuit the only flow of lines through it is those due to leakage. Under these circumstances the magnetic potential or stress in the armature-core, in connection with the conductors, will force lines to move through any external route available to form a magnetic circuit—for instance, through pole-pieces and the connecting-yoke. If in Fig. 1 a divided current flow to the right and left from S to N through the armature-coils, the current from the coils in the right-hand branch included between S and $d$ induces magnetic pressure, which tends to cause a flow of magnetic lines to pole-piece N' and establish a magnetic circuit through yoke Y to pole S' and back through armature-core. On the other hand the current in the left-hand coils extending from $s$ to $b$ tends to cause a flow of magnetic lines to pole-piece S' and establish a magnetic circuit through yoke Y, pole-piece N', and the armature-core in the opposite direction to that above stated. In other words, the coils between S and $d$ at the bottom and those at $s$ and $b$ at the top neutralize each other in a magnetic sense or in respect to causing a flow of magnetic lines. The same is true of the coils between $d\ n$ at the bottom and $b$ N at the top. The coils, however, between $n$ and N at the right and S and $s$ at the left, or those included in the double angle of commutation, all act to produce a motion of magnetic lines (upward in the particular drawing) and form a magnetic circuit from N' to S' through the armature-core and from S' to N' through the yoke Y. As half the current goes through the right-hand branch of the armature-circuit and half through the left-hand branch in parallel, the exciting force in ampere-turns equals the number of turns in one branch of the circuit included in the double angle of commutation multiplied by the whole current. In the case of a cylinder or drum wound armature the number of turns around the armature as a whole and the current therein are to be considered. Each of the armature-conductors, though acting as a turn of the field through the double angle of commutation between S and $s$ and N and $n$, and therefore so counted, also acts as an inductor in crossing the pole-pieces, so all turns must be considered inductors, as is customary, in calculating the electromotive force.

Having thus established that whenever the brushes of an armature are shifted from the normal line of commutation a field is established by the flow of lines across the armature which pass through the pole-pieces and yoke it is evident that such field may either assist or diminish any field formed by turns wound upon any portion of the magnetic circuit—as, for instance, the yoke Y. It follows, therefore, that the field produced by the armature must be considered in exactly the same way as series turns upon an ordinary field, and I find by experiment that this conclusion is correct, and hence, since my discovery enables others to know, first, that a field is established in this way and, second, to determine its value, it follows that dynamos or motors designed on this basis may be protioned so as to secure the same results as other series dynamos or motors and that the strength of the field may be varied and the motor reversed by shifting the brushes angularly, more or less, as the case may be, through the double angle of commutation.

There are certain limitations and changes of proportion which this form of construction imposes. For instance, a motor to be operative must have sufficient field to overcome sparking. Therefore the brushes cannot be moved for the purposes of regulation quite down to the normal line of commutation $e f$. The brushes may be shifted to enlarge the angle of commutation until the plane of commutation closely approaches or intersects the edges of the pole-pieces for a little distance. The greater the angle of commutation the greater the field and the slower the apparatus operates as a motor, though the torque is increased. As a dynamo which would require a motion of the armature in the opposite direction the electromotive force is increased by increasing the field. On the contrary, the shifting of the brushes nearer the normal line of commutation reduces the field, thereby decreasing the electromotive force of the dynamo and increasing the speed of the apparatus when operating as a motor by decreasing its counter electromotive force. In order to obtain as large a field with this construction as may be desired, it will in general be necessary to narrow the pole-pieces. For instance, the number of turns on armature in the double angle of commutation on both sides between the pole-pieces may be made one-half of the total number of turns on the armature. Variations may, however, be made either side of this suggested proportion for the reason that dynamos and motors will operate with less field than given under such circumstances, and where practicable I prefer to increase the field by narrowing the pole-pieces and increasing the double angle of commutation, so that more than half the coils are available to produce a field, the desirable relation of field and armature strengths being the same for this as for any series motor.

The effect of narrowing the pole-pieces is to increase the reluctance of the magnetic circuit—that is, the area of the air-gaps will be in general diminished relative to the section of the armature and field-core, so that a greater exciting force will be required to force the magnetic lines across the air-gaps, and in a toothed armature the number of teeth opposite the pole-pieces will be correspondingly diminished, thereby increasing the reluctance of the magnetic circuit through such teeth. This difficulty can be overcome in two ways—first, by increasing the diameter of the armature and maintaining the cross-sections of the armature-core and of the field, as before. This will have the effect, for a given angle of commutation, to make the faces of the pole-pieces wider, though embracing the same angle. Another method is to increase the length of the armature, so that the total area of the pole-pieces will be the same as for ordinary motors and dynamos with a given cross-section of field and armature-core. Ordinarily the length will not be increased to give quite as large a proportion of area of pole-pieces to cross-section of armature-core as is customary with other dynamos and motors, so that a little more exciting force will be required, which can well be permitted on account of the simplicity of construction. The governing conditions being thus stated any expert can modify the proportions along the lines suggested, making the compromise in any way which in his judgment may seem best adapted to the particular work to be done.

The principles of excitation from the armature-coils may readily be applied to a multipolar dynamo or motor. In Fig. 2, A represents the armature as before, but surrounded by the circular field-yoke B, provided with any desired number of polar projections extended inwardly toward the armature, four being shown in this case, at N' N' and at S' S'. If it be arranged that the current in the armature-coils be distributed in as many circuits as there are pairs of poles—for instance, by the use of four brushes in this particular case, and these brushes and their connections be so arranged that current will enter the coil at S and S near one of the edges of each of the pole-pieces N' N' and pass from the armature through two other brushes, N N, correspondingly situated in relation to the two intermediate pole-pieces S S—there will be the same action in relation to each pair of poles of opposite polarity as has been described in relation to two poles in Fig. 1. For instance, magnetic lines will flow in the armature-core in either direction from S at the bottom until they meet the influence of similar lines flowing in either direction from S at the top. As a result these lines will enter the pole-pieces S' S' in two streams, which severally turn backward through the thin portions of the field-yoke B, two streams proceeding downward and passing through pole-piece N' back to the armature-core, completing two lower magnetic circuits, and two streams passing upward and through the pole-piece N' at the top back to the armature-core at the top, thus completing two magnetic circuits at the top. The influence of different portions of the armature-coils in relation to the pole-pieces of each pair of poles of opposite polarity will be the same as has been described in relation to Fig. 1, and there will still be left the magnetic lines produced by the armature-coils included in the double angles of commutation N O n or S O s between each pair of poles to produce a field through each pair, the same as described in relation to the two poles in Fig. 1, and the direction of motion will be reversed by changing the brushes to opposite sides of the normal line of commutation the same as in the other case. Evidently the operation would be the same if in Fig. 1 a simple iron bar were placed inside the armature to take the place of the field-yoke Y and the pole-pieces N' and S', or the same in Fig. 2 if a simple iron cross were placed inside the armature to take the place of the field-yoke B, with the arms forming the pole-pieces, and in either case the armature or the field may be revolved, providing in the former case the brushes are stationary and in the latter case that the brushes revolve and proper collecting-rings and subsidiary brushes be provided to take the current out to stationary terminals. This particular invention is, however, confined as to details and combinations to the construction in which the armature revolves, but as to proportions to all of the forms stated. It will be understood that four brushes and four circuits need not actually be employed in Fig. 2. The armature may be wound in such way that there will be but two brushes and two circuits by arranging to connect the coils or single conductors in series to different segments, so that they will bear the same relation to each of a number of pairs of poles as to a single pair in a manner now generally understood.

Fig. 3 shows a dynamo or motor in which the field is separately excited by series and shunt coils and in which the total field may be varied by angularly shifting the brushes. A bipolar machine is shown like that in Fig. 1, S' and N' being the pole-pieces, F a bar field-magnet, and Y and Y² yokes connecting the magnet with the pole-pieces. An armature A is provided supposed to be of the tooth-ringed type, the grooves being shown for the reception of the conductors. In this case a separate commutator G is also shown, the sections of which are to be connected in the customary way to coils in the notches of armature. The brushes S and N are to be attached to a ring H, suitably guided to turn through a limited angle concentrically with the center of the armature and to be insulated from each other in any customary manner. Connected with the ring H by an arm is a slotted arc and handle I, which, by means of a stationary clamp-screw, may, with the brushes S and N, be held in any desired angular position, limited only by the length of the slotted arc. As shown, the current enters through one main terminal $x$, and by means of a coiled conductor connecting to brush S passes through the commutator to coils of the armature A, opposite such brush, thence in two circuits through the armature-coils to brush N, and through a coiled conductor to series turns J on the magnet F, and thence to the main terminal at $z$. A shunt-winding M of fine wire with many turns is also provided on the magnet F, the terminals generally connecting to the main terminals $x$ and $z$. In one of the branches a resistance coil or rheostat K is provided connected at various portions of its length to regulator-points, to either of which a regulating-lever L may be brought and the amount of current flowing through the shunt varied by the amount of resistance in the circuit.

It will be understood that the brushes at S and N, Figs. 1 and 2, will, through suitable holders, be attached to an adjustable ring and operating device equivalent to H and I, Fig. 3, and electric connections so made that the brushes will form the electric terminals of the machine.

The present invention relates to a discovery and to changes in construction; also, to the arrangement, proportion, and modes of operation of well-known mechanical details which, guided by such discovery, produce better and more certain results than have heretofore been accomplished, and a dynamo or motor which as a whole is new. It is a common construction in nearly all dynamos and motors to provide means to move the brushes angularly a certain distance, and such means are very frequently used to reduce sparking at the points of contact of the commutator and brushes. To other investigators working in different directions it is known also that the shifting of the brushes has an influence on the potential of the current delivered by a dynamo or on the speed of a motor, but the laws which govern the results have never been thoroughly explained. It is true also that the influence of the coils in the double angle of commutation and of the remaining coils of an armature has been discussed in scientific language with reference to what is termed "armature reaction," and in other connections it has been suggested that there is an armature-field, but the same has not been so investigated that it could be segregated and utilized regularly in practice, whereas I have shown how it can be measured and therefore accounted for in examining the results of experiments or utilized in new designs with the same certainty as if a given number of ampere-turns were put upon the field-magnets. I point out that the ampere-turns produced by the armature are series turns. I point out the angle through which the number of turns on the armature is to be counted in estimating the ampere-turns. I am thus enabled to point out how to make designs of electric motors and, if required, of dynamos in which the entire exciting force of the field is derived from the armature.

I have several times in the foregoing description spoken of "north" and "south" consequent poles in the core of an armature opposite the points where the current enters and leaves the armature-coils and have referred to the reaction between the armature and pole-pieces as if in a sense caused by the polarity of the former.

I am well aware that it is not customary to attribute the current from a dynamo or the torque of a motor to the approach or recedence of similar poles, but to the fact that the armature-conductors cross lines of force established by the field across the armature, &c. It is also true, however, that the disposition of the coils of the armature about the core is such that poles are formed in such core, and it has seemed to me simpler to recognize this fact in the description than to confuse it by the more abstruse even if the more general theory. The results are the same whether the reaction be considered as taking place between the pole-pieces and the inductors or exterior conductors on the surface of the armature or between such pole-pieces and the poles formed by the fact that such inductors are portions of coils inclosing the armature-core. It is a fact also that my discovery requires for its explanation a development of the fact that the armature-coils induce a flow of magnetic lines in the armature-core when such lines have an opportunity to escape and return through an external circuit, which is another reason for making the explanation in the terms stated.

It should be understood that the terms "north" and "south," whether expressed in relation to the polarity of the pole-pieces or of poles formed in the armature by a positive or negative current circuiting in a particular direction, are only relative and mean principally that north and south polarity and positive and negative current are opposite to each other or of different signs, not that the directions of current and magnetic lines are absolutely fixed by such terms, though the resulting phenomena are conveniently expressed thereby. Even if the direction of one necessarily be exactly opposite that stated in order to produce the phenomena referred to in reference to the other, the final results will be the same. In fact, what is ordinarily called in some countries the "north" pole of a magnetic needle, because it points north, is elsewhere called the "south" pole of the needle, because it seeks the north pole of the earth.

From the above description it is evident that the operation of the handle I, Fig. 3, adjusting the angular position of the brushes will change the number of ampere-turns in the series field by adding to such field for motion in one direction and subtracting from the same for motion in the other direction and that, independent of the number of series coils J from zero upward, the shifting of the brushes will generate a series field exactly as described in relation to Fig. 1, which will modify the total field without changing the resistance of the main circuit. When a considerable portion of the total field is derived from the armature, a greater number of commutator-sections than is customary, or some equivalent means, must be employed to prevent sparking.

I claim as my invention and desire to secure by Letters Patent—

1. An electric dynamo or motor, without field-coils, provided with an armature, a commutator, commutating-brushes, a permeable yoke and pole-pieces attached thereto, with the width and length of the faces of such pole-pieces so proportioned and the angle of commutation so adjusted by shifting the brushes that the required number of turns of the armature (counted on one side) will be included in the double angle of commutation to produce, with the current flowing in the armature, the desired number of ampere-turns of exciting force to produce the field, substantially as herein described.

2. An electric dynamo or motor, without field-coils, provided with an armature, a commutator, commutating-brushes, a permeable yoke and pole-pieces attached thereto, with the width and length of the faces of such pole-pieces so proportioned and the angle of commutation so adjusted by shifting the brushes that the required number of turns of the armature will be included in the double angle of commutation to produce, with the current flowing in the armature, a desired number of series turns of field-exciting force, substantially as herein described.

CHAS. E. EMERY.

Witnesses:
LIVINGSTON EMERY,
J. A. RUOFF.